United States Patent Office

3,205,075
Patented Sept. 7, 1965

3,205,075
MULTI-FLAVOR SLAB CHEWING GUM
Robert Heggie and Edwin R. Koch, Garden City, N.Y., assignors, by mesne assignments, to Warner-Lambert Pharmaceutical Company, Wilmington, Del., a corporation of Delaware
No Drawing. Filed Sept. 8, 1961, Ser. No. 136,729
2 Claims. (Cl. 99—135)

This invention relates to chewing gums and more particularly to novel slab chewing gums. Still more particularly, this invention relates to a novel candy seeded slab chewing gum and to processes for producing same.

In the preparation of conventional slab chewing gums, a base is first prepared by heating and blending together the various ingredients which form the base, such as natural gum, synthetic resins, waxes, fillers, etc. To the completed base is added corn syrup, sugar and one or more flavoring materials. These components are subjected to mild heating, as for example, somewhat above 100° F. in a mixing kettle having mixing blades or agitators which blend the constituents into a homogeneous dough-like mass. The mass is then unloaded from the kettle, cooled, rolled, scored, set and broken into individual slab pieces. A complete gum batch having a total weight of 100 pounds, generally consists of about 15–30% gum base, about 10–20% corn syrup and about 50–75% sugars.

The marketing of slab chewing gums is such that the packaged gums must have a shelf life of many months and consequently there is always the problem of flavor deterioration due to oxidation or by other means during the shelf life of the gum. Furthermore, in the normal processing of slab chewing gums, the flavoring materials, whether they be the same or different flavoring agents, are added to the gum together with the sugar and corn syrup and consequently are intimately admixed during the processing operations. Thus, though many different flavors may be added during the processing of the gum, the consumer upon chewing only obtains the taste of a single flavor due to the mingling and admixture of all the flavors during the gum processing.

It is therefore an object of this invention to provide a novel slab chewing gum having enhanced flavor life.

It is another object of this invention to provide slab chewing gums seeded with candy or other edible materials.

It is a further object of this invention to provide multi-flavored slab chewing gums having enhanced shelf life.

It is a still further object of this invention to provide processes for producing these novel slab chewing gums.

Therefore, in accordance with this invention, there is provided a slab chewing gum comprising gum base, corn syrup, flavoring and sugars, said slab being impregnated with flakes of an edible material.

The edible materials may be coconut shreds, clear sugar crystals, peanut chips, candy chips, etc. Preferably we prefer to employ nonpareil seeds which can be used in place of a portion of the sugar in the gum in a range of from about 5 to 15% based on the total weight of the gum. The concentration and hardness of the seeds may be varied to obtain the desired effect in the finished gum. For example, if a hard crunchy gum is desired, the seeds would be used in maximum concentration and the hardness of the seeds would be considerably greater than would be the case if a soft crunchy gum were desired. The seeds may be any desired color and may vary in size from about 0.046" to 0.070", i.e. about 9 to 14 mesh, assuming that the slab gum has a thickness of about 73 mils. If the slab gum is thinner or thicker than normal, the size of the seeds may be increased or decreased proportionately. The seeds in the finished gum may be flavored depending upon the effect desired as will be discussed in greater detail hereinafter.

In preparing the gums of this invention, the edible materials such as the nonpareil seeds may be incorporated into the gum blend during the mixing process or else the edible materials may be pressed onto the slabs just before the rolling and scoring operation has been completed.

We have found that in order to prevent the seeds from being crushed during the rolling or scoring operation, thus giving the gum an unsightly appearance, the gum base should be soft and flexible so that the seeds may easily penetrate the base and be dispersed throughout the base. We have found that the best results are obtained when the base is composed of a significant amount of synthetic resins or plasticizers such as glycerin, etc., and softeners such as glyceryl monostearate, hydrogenated vegetable oil etc.

If the seeds are to be flavored, the seeds may be coated with a thin layer of the flavoring followed by the addition of another sugar layer followed by the addition of a further flavoring layer, etc., and this procedure may be continued until the seeds are of the desired size. If desired, a single flavoring layer may be applied but we have found that the best results are obtained when several layers of flavoring are employed.

Thus it is now possible to prepare slab chewing gums containing different flavors and to prevent admixture of the flavors thereby preserving each flavor separate from the other until such time as the gum is chewed. For example, one flavor may be added to the gum base while another flavor may be incorporated in the seeds. In addition a blend of seeds containing different flavors may be dispersed throughout the gum base and used in any proportion up to the maximum percentage of seeds in the gum formula. Hence the use of flavoring in the seeds permits the flavoring to remain stationary and prevents its migration into the chewing gum base until such time as the gum is chewed.

Any desired flavor effect can therefore be obtained ranging from a single flavor to an indefinite number of flavors. As an illustration of this, the base flavor can be peppermint, while one-half of the seeds can be flavored with anise and the other half with menthol. These flavors will remain separated until the gum is chewed at which point unique effects will be noted by the consumer. Since the flavor is entrapped in each individual seed and its not released until such time as the gum is chewed, the crushing of the seed releases a burst of flavor which when taken in combination with the release of different flavors, either in other seeds or in the base, produces a unique multi-flavor slab chewing gum. The flavors referred to above are of course only illustrative and any desired combination may be incorporated in the gum.

These gums, in addition to being multi-flavored, also have the property of protecting the sensitive flavors from deterioration. It is well known that when a sensitive flavor, such as peppermint oil, is incorporated in the gum base as in conventional gums, the flavor deteriorates upon aging and the gum loses some of its original desirable flavor characteristics. We have discovered that sensitive flavors such as peppermint oil can be protected by coating the flavors with a sugar shell thus retarding the deterioration process which occurs on aging and hence enhances the shelf life of the product, thus giving the consumer a more flavorful product.

Having thus provided a written description of the present invention and provided specific examples thereof, it should be understood that no undue restrictions or limitations are to be imposed by reason thereof but that the present invention is defined by the appended claims.

We claim:
1. A multi-flavor slab chewing gum having a thickness of about 73 mils and comprising about 15–30% gum base, about 10–20% corn syrup, about 50–75% sugars and flavoring, about 5–15% of said sugars being in the form of candy seeds having a size range of about 0.046" to 0.070" and dispersed throughout said slab chewing gum, said candy seeds containing a second flavoring different from said flavoring of the gum base.

2. A multi-flavor slab chewing gum having a thickness of about 73 mils and comprising about 15–30% gum base, about 10–20% corn syrup, about 50–75% sugars and flavoring, about 5–15% of said sugars being in the form of candy seeds having a size range of about 0.046" to 0.070" and dispersed throughout said slab chewing gum, said candy seeds containing at least two differently flavored portions of candy seeds.

References Cited by the Examiner
UNITED STATES PATENTS

| | | | |
|---|---|---|---|
| 2,857,281 | 10/58 | Schultz et al. | 99—140 |
| 2,886,446 | 5/59 | Kramer et al. | 99—135 |
| 3,011,949 | 12/61 | Bilotti | 99—135 X |
| 3,062,662 | 11/62 | McDonald | 99—135 |

A. LOUIS MONACELL, *Primary Examiner.*

BEATRICE H. STRIZAK, WILLIAM B. KNIGHT,
*Examiners.*